US005584961A

United States Patent [19]

Ellsworth et al.

[11] Patent Number: 5,584,961

[45] Date of Patent: Dec. 17, 1996

[54] APPARATUS FOR APPLYING HEAT TRANSFERABLE DECALCOMANIA TO MUGS AND THE LIKE

[75] Inventors: Richard P. Ellsworth, Fairchance, Pa.; Darren B. Pav, Morgantown, W. Va.

[73] Assignee: Stahls', Inc., St. Clair Shores, Mich.

[21] Appl. No.: 337,976

[22] Filed: Nov. 14, 1994

[51] Int. Cl.[6] ...... B32B 31/00

[52] U.S. Cl. ...... 156/481; 156/492; 156/579; 156/583.3; 156/583.8

[58] Field of Search ...... 156/494, 481, 156/215, 384, 579, 583.3, 583.8, 240, 381, 492

[56] References Cited

U.S. PATENT DOCUMENTS

| | | | |
|---|---|---|---|
| 2,319,969 | 5/1943 | Besemer | 156/492 |
| 3,108,033 | 10/1963 | Carter | 156/492 |
| 3,816,221 | 6/1974 | Shank, Jr. | 156/492 |
| 3,899,913 | 8/1975 | Schlosser et al. | 156/215 X |
| 4,097,325 | 6/1978 | Schnier | 156/215 |
| 4,188,254 | 2/1980 | Hemperly, Jr. | 156/583.3 X |
| 4,874,454 | 10/1989 | Talalay et al. | 156/359 |
| 5,019,193 | 5/1991 | Aramini | 156/64 |
| 5,244,529 | 9/1993 | Siegel | 156/384 |
| 5,395,478 | 3/1995 | Sattler et al. | 156/494 X |

FOREIGN PATENT DOCUMENTS

| | | | |
|---|---|---|---|
| 452158 | 11/1927 | Germany | 156/492 |
| 0015126 | 1/1985 | Japan | 156/215 |

*Primary Examiner*—David A. Simmons
*Assistant Examiner*—Paul M. Rivard
*Attorney, Agent, or Firm*—Brooks & Kushman P.C.

[57] ABSTRACT

An apparatus for applying decalcomania to a curved surface of a container is provided. The apparatus includes a base, first and second curved rigid support members pivotally connected with respect to each other, a band mounted to the end portion of each support member, a heater assembly supported within the band, and a handle linkage adapted to open and close the support members with respect to each other. Movement of the handle linkage causes one support member to close with respect to the other support member, thereby tightening the band and heater assembly about a container for application of the decalcomania. A turn-buckle type adjustment is provided for adjusting pressure applied by the handle linkage.

3 Claims, 2 Drawing Sheets

APPARATUS FOR APPLYING HEAT TRANSFERABLE DECALCOMANIA TO MUGS AND THE LIKE

TECHNICAL FIELD

This invention relates generally to a sublimation process and more particularly to an apparatus for applying heat transferable decalcomania to a curved surface of a container by means of sublimation.

BACKGROUND ART

It is well known in the art to apply heat transferable decalcomania, commonly known as a decal, to clothing such as T-shirts. In addition to imprinting relatively flat, fibrous articles, there is also a considerable demand for decorating and personalizing curvilinear and other shapes made from inorganic materials, for instance, vitreous and ceramic articles. Accordingly, an area of art has developed in which decalcomania is applied to ceramic mugs and the like.

In this process, a carrier sheet having a heat sublimating ink design is placed against a mug, which has been previously coated with a heat softenable polyester coating, and heated sufficiently for the ink to sublimate and transfer the design to the coating. Many arrangements have been developed which are capable of applying decalcomania to a ceramic curvilinear surface.

One such arrangement is described in U.S. Pat. No. 5,019,193 to Aramini. This arrangement comprises tightly wrapping a flexible sheet-like heating blanket around a major portion of the circumferential surface of a cup over which the decalcomania has been laid. Heat is generated by the heating blanket in an amount sufficient to transfer the decalcomania to the cup.

Another such arrangement is disclosed in U.S. Pat. No. 4,874,454 to Talalay et al. This device employs a flexible transfer head which comprises a supported, flexible electric heating pad which is made to envelop and press against the surface of the article onto which the decal design is to be transferred. The pad is then electrically heated, causing the sublimation dyes on the decal interposed between the pad and the surface of the article to be transferred from the backing sheet of the decal to the article surface.

Yet another arrangement is shown in U.S. Pat. No. 5,244,529, assigned to Thermagenics Technology. This apparatus uses a metal band cuff which is wrapped around a mug. The cuff is lined with a layer of variable density foam and a high temperature electrical heater tape. The heater tape provides heat for sublimation.

Some common problems with these designs include their difficulty for use in mass production, awkwardness of the flexible blanket arrangements, difficulty in adjusting for different mug sizes, and danger posed by substantially uninsulated and unprotected heat generated by the heaters.

Accordingly, an object of the present invention is to provide a simple apparatus for applying decalcomania to mugs and the like which avoids the above referenced problems of the prior art.

Another object of the present invention is to provide an apparatus for applying decalcomania to mugs and the like which is safe and highly efficient for use in a mass production environment.

Yet another object of the present invention is to provide an apparatus for applying decalcomania to mugs and the like which is easily adjustable for different mug sizes.

SUMMARY OF THE INVENTION

Accordingly, the present invention provides an apparatus for applying decalcomania to a curved surface of a container comprising: a base; first and second curved rigid support members, the first support member being rigidly mounted with respect to the base, and the second support member being pivotally connected with respect to the first member, each of the first and second support members having end portions thereof; a generally cylindrical band having first and second ends, the first end being connected to the end portion of the first support member and the second end being connected to the end portion of the second support member; a heater assembly supported within the band and having inner and outer portions thereof; and a handle linkage pivotally connected with respect to the base and operatively connected to the second support member to pivotally open and close the second support member with respect to the first support member; whereby movement of the handle linkage in a first direction causes the second support member to close with respect to the first support member, thereby tightening the band and heater assembly about a container for application of the decalcomania.

These and other features and advantages of the present invention are disclosed in the accompanying specification and claims. One skilled in the art will appreciate that modifications to this design are embraced within the scope of the present invention as herein described.

BEST MODE FOR CARRYING OUT THE INVENTION

Figure 1:
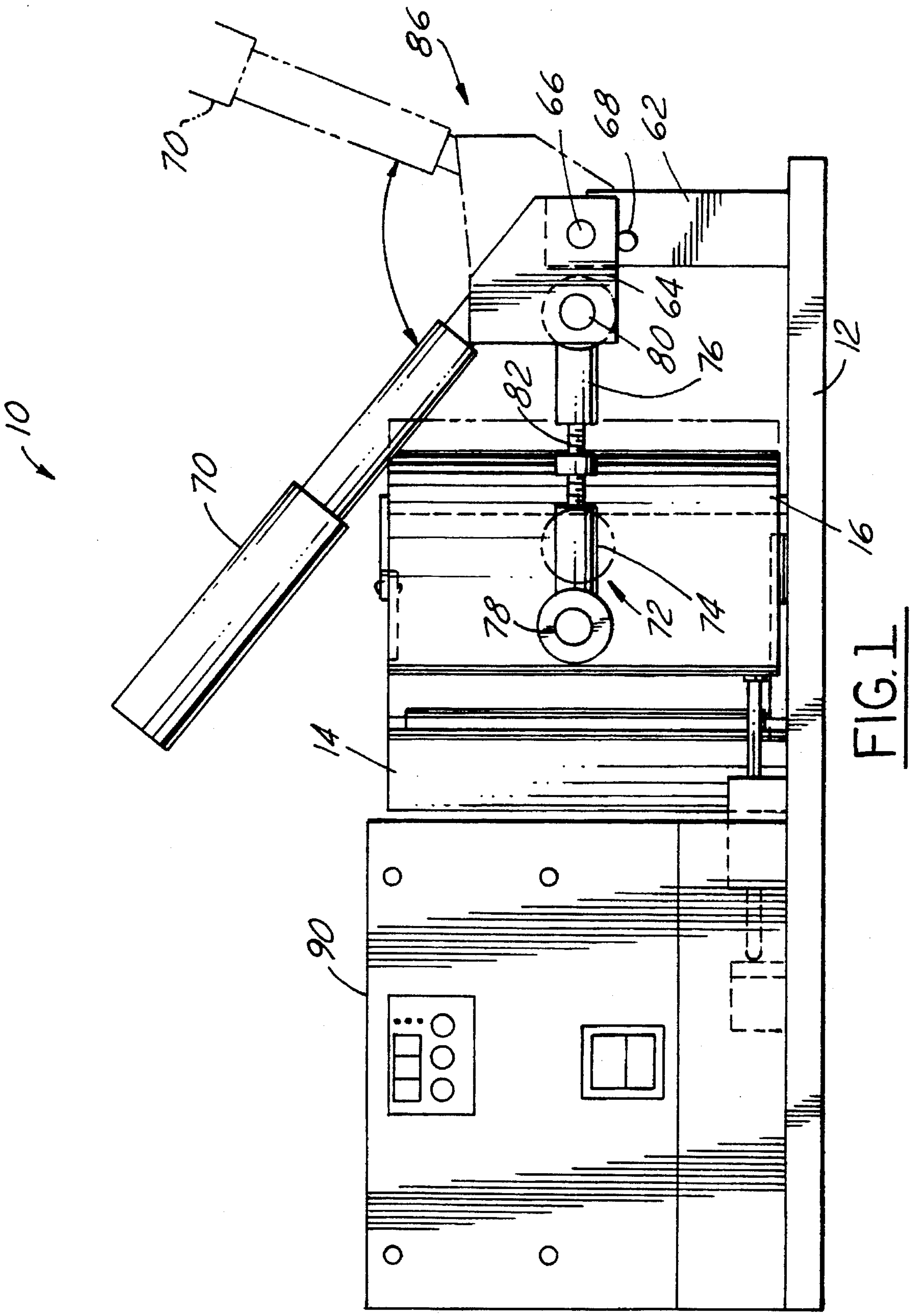
FIG. 1 is a side view of an apparatus for applying decalcomania to mugs and the like in accordance with the present invention.
Figure 2:
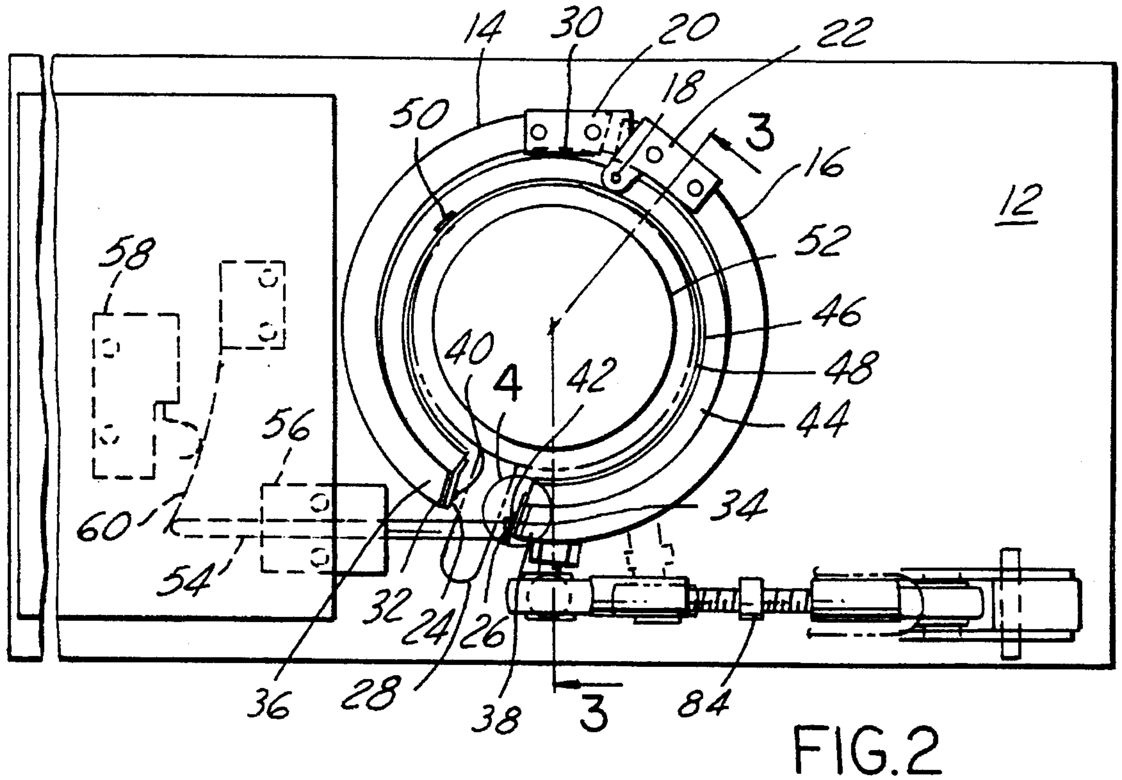
FIG. 2 is a top plan view of an apparatus for applying decalcomania to mugs and the like in accordance with the present invention.
Figure 3:
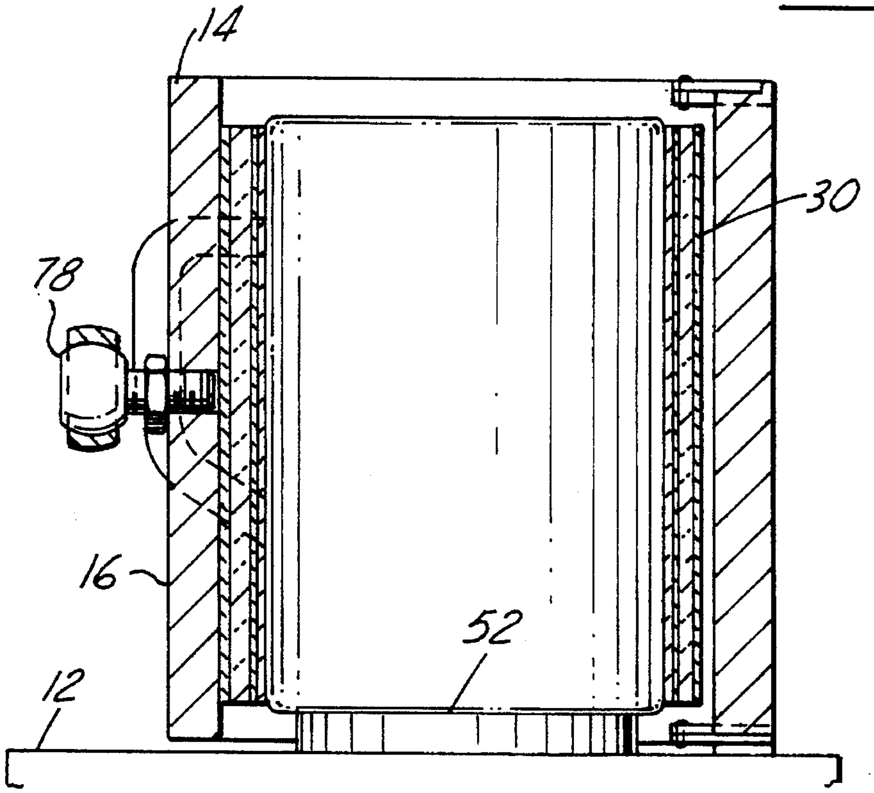
FIG. 3 is a vertical cross section of an apparatus for applying decalcomania to mugs and the like in accordance with the present invention.

Referring to FIG. 1, an apparatus 10 for applying decalcomania to mugs and the like is shown. A base 12 is provided for supporting the apparatus 10. First and second rigid support members 14,16 are provided on the base 12. The rigid support members 14,16 are comprised of aluminum tubing sections. The rigid support member 14 is rigidly mounted to the base 12. The rigid support member 16 is pivotally mounted to the support member 14 about the pivot pin 18, as shown in FIG. 2. Brackets 20,22 are provided for connecting the curved rigid support members 14,16 about the pivot pin 18.

Figure 4:
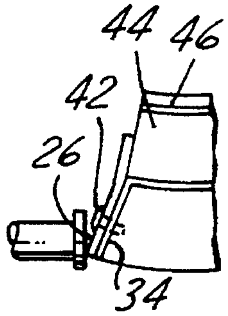
FIG. 4 is an enlarged view of the circled area designated 4 in FIG. 2.

Referring to FIGS. 2 and 4, a pair of retaining plates 24,26 retain a heater subassembly within the curved rigid support members 14,16 in order to apply decalcomania to a mug 28. A generally cylindrical band 30 is provided with ears 32,34 for mounting the band 30 to the end portions 36,38 of the rigid support members 14,16. This mounting is provided by screws 40,42 which secure the ears 32,34 of the band 30 between the retaining plates 24,26 and the end portions 36,38 of the rigid support members 14,16. The band 30 is mounted to the support members 14,16 only by its ears 32,34 such that closure of the support members 14,16 will tighten the band 30 around the heater subassembly to evenly distribute pressure to the mug 28.

Supported within said band 30 is a ⅜" thick silicone foam pad 44. The foam pad 44 is not rigidly connected to the band. Rather, it is fitted within the band 30 and held into position by the retaining plates 24,26. In this manner, the foam pad and heater assembly may be easily removed and replaced when the heater fails.

A flexible heater 46 is supported within the foam pad 44. The foam pad 44 is bonded to the back of the flexible heater 46. A thin, heat conductive pad 48 is supported within the flexible heater 46 for transferring heat from the flexible heater to the mug. A resistance temperature detector 50 is provided for monitoring temperatures of the flexible heater 46. A bottom cushion 52 is provided for supporting the mug to be imprinted.

A timer rod 54 is spring loaded against the end portion 38 of the rigid support member 16 by the biasing member 56. As the rigid support member 16 pivots in and out with respect to the rigid support member 14, the timer rod 54 actuates the timer switch 58 by means of the switch extender 60. When the timer switch 58 is actuated, the flexible heater 46 is brought up to an operating temperature between 380° and 400° F. Upon actuation, the timer switch begins a countdown. Once the timer has counted down to a predetermined time limit, the timer beeps in order to notify the operator that it is time to remove the mug.

Referring back to FIG. 1, a support pin 62 is mounted to the base 12 for supporting the handle assembly. A coupling 64 is pivotally mounted to the support pin 62 at the pivot joint 66. Rotational movement of the coupling 64 with respect to the support pin 62 is limited by the dog 68. A handle 70 is rigidly mounted to the coupling 64 for operator manipulation of the apparatus. A drive rod 72 connects the coupling 64 to the rigid support member 16. The drive rod 72 comprises first and second rod end sleeves 74,76. The first rod end sleeve 74 is pivotally connected to the rigid support member 16 about the pivot joint 78. The second rod end sleeve 76 is pivotally connected to the coupling 64 about the pivot joint 80. The first and second rod end sleeves 74,76 are internally threaded to receive the threaded adjustment screw 82. One end of the threaded adjustment screw 82 has a left hand thread, and the opposite end has a right hand thread, so that rotation of the knurl 84 causes the first and second rod end sleeves 74,76 to move together or to separate with respect to each other. In this manner, the operator may easily adjust the distance between the rigid support members 14,16, thereby providing a pressure adjustment for application of decalcomania to a mug. This turn-buckle type adjustment allows for easy adjustment for insertion of mugs of different sizes.

The clamping mechanism 86 for this apparatus is an inline clamp. When the handle 70 is rotated in the direction of the mug, the coupling 64 rotates about the pivot joint 66. Rotational movement of the coupling 64 is limited by the dog 68. When the coupling 64 bottoms out against the dog 68, the pivot joints 66,78,80 are aligned. This arrangement provides substantial linear pressure, which locks the support members 14,16 about the mug, and tension of the band 30 provides evenly distributed pressure to the mug. The clamping mechanism 86 is designed to provide high pressures with little operator effort.

When a heater 46 fails, the heater 46 and pads 44,48 may be easily removed and replaced because there is no fixed attachment of the heater and pad to the band 30 or support members 14,16.

The process controller 90 is unique in that while it is in standby mode, the heater 46 is kept around 300° F. When the machine is closed, the heater warms the mug to set temperature, normally between 380° and 400° F. The controller 90 maintains that temperature for the time period entered into the controller. In addition, the resistance temperature detector 50, along with the controller 90, prevents the temperature from increasing once the handle 70 is opened. This prolongs the life of the heater and protects the user from the high temperatures that the heater radiates when in imprinting mode. In addition, the heavy rigid support members 14,16 along with the ⅜" thick foam pad 44 protect the operator from the high heats generated in operation.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

What is claimed is:

1. An apparatus for applying heat-transferable decalcomania to a curved surface of a container, comprising:

a base;

first and second curved rigid support members, said first support member being rigidly mounted with respect to said base, and said second support member being pivotally connected with respect to said first member, each of said first and second support members having end portions thereof;

a generally cylindrical flexible band having first and second ends, said first end being connected to said end portion of said first support member and said second end being connected to said end portion of said second support member;

a heater assembly supported within said cylindrical band and having inner and outer portions thereof; and a handle linkage comprising a support pin mounted to said base, a coupling pivotally connected to said pin about a first axis, a handle mounted to said coupling, and a drive rod assembly having first and second ends, said first end of said drive rod assembly being pivotally connected to said coupling about a second axis and said second end of said drive rod assembly being pivotally connected with respect to said second support member about a third axis, said drive rod assembly further comprising first and second internally threaded sleeves connected to said first and second ends of said drive rod assembly, respectively, and a threaded adjustment screw cooperating with said first and second internally threaded sleeves for adjusting the distance between said second and third axes, whereby pivotal movement of said handle in said first direction causes said coupling to pivot with respect to said support pin about said first axis, thus moving said drive rod assembly in a direction to close said second support member with respect to said first support member, thereby tightening said band and heater assembly about a container for application of the decalcomania.

2. The apparatus for applying decalcomania of claim 1, wherein movement of said handle to its full extent in said first direction places said first, second and third axes in parallel and substantially coplanar relationship with respect to each other, whereby to lock said handle linkage in a closed position for applying decalcomania to a container.

3. The apparatus for applying decalcomania of claim 1, further comprising:

a foam pad bonded to said outer portion of said heater assembly; and a heat-conductive pad bonded to said inner portion of said heater assembly, said heat-conductive pad being thinner than said foam pad.

* * * * *